(12) United States Patent
Chaturvedi et al.

(10) Patent No.: US 9,357,016 B2
(45) Date of Patent: May 31, 2016

(54) SYSTEM AND METHOD FOR VIRTUAL PARALLEL RESOURCE MANAGEMENT

(71) Applicant: DAMAKA, INC., Richardson, TX (US)

(72) Inventors: Sivakumar Chaturvedi, Allen, TX (US); Satish Gundabathula, Irving, TX (US); Rajaraman Krishnan, Chennai (IN)

(73) Assignee: Damaka, Inc., Richardson, TX (US)

( * ) Notice: Subject to any disclaimer, the term of this patent is extended or adjusted under 35 U.S.C. 154(b) by 452 days.

(21) Appl. No.: 14/057,872

(22) Filed: Oct. 18, 2013

(65) Prior Publication Data

US 2015/0113119 A1    Apr. 23, 2015

(51) Int. Cl.
*G06F 15/16* (2006.01)
*H04L 29/08* (2006.01)
*H04L 29/06* (2006.01)

(52) U.S. Cl.
CPC ........ *H04L 67/142* (2013.01); *H04L 29/06401* (2013.01); *H04L 65/4015* (2013.01); *H04L 69/28* (2013.01)

(58) Field of Classification Search
CPC .................... H04W 72/1215; H04W 72/1242; H04W 72/1247; H04L 29/06401; H04L 65/4015
USPC .................................................. 709/204, 205
See application file for complete search history.

(56) References Cited

U.S. PATENT DOCUMENTS

| | | | |
|---|---|---|---|
| 5,442,637 A | 8/1995 | Nguyen | |
| 5,761,309 A | 6/1998 | Ohashi et al. | |
| 5,790,637 A | 8/1998 | Johnson et al. | |
| 5,818,447 A | 10/1998 | Wolf et al. | |
| 5,889,762 A | 3/1999 | Pajuvirta et al. | |
| 6,031,818 A | 2/2000 | Lo et al. | |
| 6,128,283 A | 10/2000 | Sabaa et al. | |
| 6,141,687 A | 10/2000 | Blair | |
| 6,161,082 A | 12/2000 | Goldberg et al. | |
| 6,202,084 B1 | 3/2001 | Kumar et al. | |
| 6,219,638 B1 | 4/2001 | Padmanabhan et al. | |
| 6,298,129 B1 | 10/2001 | Culver et al. | |
| 6,311,150 B1 | 10/2001 | Ramaswamy et al. | |

(Continued)

FOREIGN PATENT DOCUMENTS

| | | |
|---|---|---|
| EP | 1404082 A2 | 3/2004 |
| EP | 160339 A1 | 12/2005 |

(Continued)

OTHER PUBLICATIONS

PCT: International Preliminary Report on Patentability of PCT/US2008/075141; Mar. 9, 2010; 5 pgs.

(Continued)

*Primary Examiner* — Aftab N. Khan
(74) *Attorney, Agent, or Firm* — Howison & Arnott, LLP

(57) ABSTRACT

An improved system and method are disclosed for providing virtual parallel access to a shared resource. In one example, the method includes receiving a request from a device to take control of the shared resource. After determining that another device is currently in control of the shared resource, a timer is started. Control of the shared resource will automatically pass from the device currently in control to the requesting device when the timer expires. Input received from the device currently in control is executed. Input received from the device that has requested control is buffered and executed once control is transferred.

17 Claims, 8 Drawing Sheets

(56) References Cited

U.S. PATENT DOCUMENTS

| | | |
|---|---|---|
| 6,343,067 B1 | 1/2002 | Drottar et al. |
| 6,360,196 B1 | 3/2002 | Poznanski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,741,691 B1 | 5/2004 | Ritter et al. |
| 6,754,181 B1 | 6/2004 | Elliott et al. |
| 6,766,373 B1 | 7/2004 | Beadle |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 9,009,513 B2 * | 4/2015 | Yamamoto .............. G06F 1/324 713/322 |
| 2001/0050923 A1 | 12/2001 | Park et al. |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0124096 A1 | 9/2002 | Loguinov et al. |
| 2002/0143548 A1 | 10/2002 | Korall et al. |
| 2002/0150110 A1 * | 10/2002 | Inbar ...................... H04L 29/06 370/401 |
| 2002/0152325 A1 | 10/2002 | Elgebaly et al. |
| 2002/0156844 A1 | 10/2002 | Maehiro |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0212772 A1 | 11/2003 | Harris |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2003/0229715 A1 | 12/2003 | Baratakke et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | LaVallee et al. |
| 2004/0044517 A1 | 3/2004 | Palmquist |
| 2004/0052234 A1 | 3/2004 | Ameigeiras et al. |
| 2004/0062267 A1 | 4/2004 | Minami et al. |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |
| 2004/0143678 A1 | 7/2004 | Chari et al. |
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |

(56) References Cited

U.S. PATENT DOCUMENTS

| | | |
|---|---|---|
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai |
| 2006/0195402 A1 | 8/2006 | Malina et al. |
| 2006/0203750 A1* | 9/2006 | Ravikumar ........... H04L 63/102 370/261 |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0246903 A1 | 11/2006 | Kong et al. |
| 2006/0258289 A1 | 11/2006 | Dua |
| 2007/0015535 A1* | 1/2007 | LaBauve ........... H04L 29/06027 455/552.1 |
| 2007/0016921 A1 | 1/2007 | Levi et al. |
| 2007/0019545 A1* | 1/2007 | Alt ..................... H04L 12/4633 370/230 |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0069105 A1* | 3/2008 | Costa ................ H04L 63/0853 370/392 |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1* | 9/2008 | Kjesbu ................ H04M 3/567 709/223 |
| 2008/0235511 A1 | 9/2008 | O'Brien et al. |
| 2008/0250408 A1* | 10/2008 | Tsui ..................... H02J 7/0055 718/100 |
| 2008/0273541 A1 | 11/2008 | Pharn |
| 2008/0320096 A1 | 12/2008 | Szeto |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1* | 5/2009 | Gornoi .................. H04L 12/66 379/212.01 |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Vizaei |
| 2010/0049980 A1 | 2/2010 | Barriga et al. |
| 2010/0077023 A1 | 3/2010 | Eriksson |
| 2010/0107205 A1 | 4/2010 | Foti |
| 2010/0174783 A1* | 7/2010 | Zarom .................. G06F 9/526 709/205 |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0138290 A1* | 6/2011 | Park ................... H04L 12/2809 715/734 |
| 2011/0145687 A1 | 6/2011 | Grigsby et al. |
| 2011/0314134 A1 | 12/2011 | Foti |
| 2012/0176976 A1* | 7/2012 | Wells ................. H04W 52/0219 370/329 |
| 2012/0263144 A1 | 10/2012 | Nix |

FOREIGN PATENT DOCUMENTS

| | | | |
|---|---|---|---|
| EP | 1638275 A2 | 3/2006 | |
| EP | 1848163 A1 * | 10/2007 | ............. H04L 45/00 |
| EP | 1988697 A1 | 11/2008 | |
| EP | 1988698 A1 | 11/2008 | |
| JP | 2005-94600 | 4/2005 | |
| JP | 2007-043598 | 2/2007 | |
| KR | 10-2005-0030548 | 3/2005 | |
| WO | WO 03/079635 | 9/2003 | |
| WO | WO 2004/063843 | 7/2004 | |
| WO | WO 2005/009019 | 1/2005 | |
| WO | 2006064047 A1 | 6/2006 | |
| WO | WO 2006/075677 A1 | 7/2006 | |

OTHER PUBLICATIONS

PCT: International Preliminary Report on Patentability of PCT/US2007/068820; Dec. 31, 2008; 8 pgs.

PCT: International Preliminary Report on Patentability of PCT/US2007/068823; Nov. 27, 2008; 8 pgs.

PCT: International Preliminary Report on Patentability of PCT/US2006/047841; Nov. 6, 2008; 7 pgs.

PCT: International Preliminary Report on Patentability of PCT/US2007/002424; Aug. 7, 2008; 6 pgs.

PCT: International Preliminary Report on Patentability of PCT/US2006/040312; May 2, 2008; 5 pgs.

(56) References Cited

OTHER PUBLICATIONS

PCT: International Preliminary Report on Patentability of PCT/IB2005/000821; Oct. 19, 2006; 10 pgs.
PCT: International Search Report and Written Opinion for PCT/US2011/024870; Oct. 26, 2011; 12 pages.
J. Rosenberg et al. "Session Traversal Utilities for NAT (STUN)", draft-ietf-behave-rtc3489bis-06, Mar. 5, 2007.
PCT: International Search Report and Written Opinion for PCT/US2011/028685; Nov. 9, 2011; 10 pages.
PCT: International Search Report and Written Opinion for PCT/US2011/029954; Nov. 24, 2011; 8 pages.
PCT: International Search Report and Written Opinion for PCT/US2011/024891; Nov. 25, 2011; 9 pages.
PCT: International Search Report and Written Opinion for PCT/US2011/031245; Dec. 26, 2011; 13 pages.
Wireless Application Protocol—Wireless Transport Layer Security Specification, Version Feb. 18, 2000, Wireless Application Forum, Ltd. 2000; 99 pages.
PCT: International Search Report and Written Opinion for PCT/US2011/040864; Feb. 17, 2012; 8 pages.
PCT: International Search Report and Written Opinion for PCT/US2011/041565; Jan. 5, 2012; 7 pages.
PCT: International Search Report and Written Opinion for PCT/US2011/031246; Dec. 27, 2011; 8 pages.
PCT: International Search Report and Written Opinion for PCT/US2011/049000; Mar. 27, 2012; 10 pages.
PCT: International Search Report and Written Opinion for PCT/US2011/051877; Apr. 13, 2012; 7 pages.
PCT: International Search Report and Written Opinion for PCT/US2011/055101; May 22, 2012; 9 pages.
Balamurugan Karpagavinayagam et al. (Monitoring Architecture for Lawful Interception in VoIP Networks, ICIMP 2007, Aug. 24, 2008).
NiceLog User's Manual 385A0114-08 Rev. A2, Mar. 2004.
WISPA: Wireless Internet Service Providers Association; WISPA-CS-IPNA-2.0; May 1, 2009.
PCT: International Preliminary Report on Patentability of PCT/US2011/024870; Aug. 30, 2012; 7 pgs.
RFC 5694 ("Peer-to-Peer (P2P) Architecture: Definition, Taxonomies, Examples, and Applicability", Nov. 2009).
Mahy et al., The Session Initiation Protocol (SIP) "Replaces" Header, Sep. 2004, RFC 3891, pp. 1-16.
PCT: International Preliminary Report on Patentability of PCT/US2011/024891; Aug. 30, 2012; 6 pgs.
T. Dierks & E. Rescorla, The Transport Layer Security (TLS) Protocol (Ver. 1.2, Aug. 2008) retrieved at http://tools.ietf.org/htmllrfc5246. Relevant pages provided.
J. Rosenberg et al., SIP: Session Initiation Protocol (Jun. 2008) retrieved at http://tools.ietf.org/html/rfc3261. Relevant pages provided.
Philippe Bazot et al., Developing SIP and IP Multimedia Subsystem (IMS) Applications (Feb. 5, 2007) retrieved at redbooks IBM form No. SG24-7255-00. Relevant pages provided.
PCT: International Preliminary Report on Patentability of PCT/US2011/028685; Oct. 4, 2012; 6 pgs.
PCT: International Preliminary Report on Patentability of PCT/US2011/031245; Oct. 26, 2012; 9 pgs.
PCT: International Preliminary Report on Patentability of PCT/US2011/029954; Oct. 11, 2012; 5 pgs.
PCT: International Preliminary Report on Patentability of PCT/US2011/031246; Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.

Cooper et al; "The Effect of NATs on P2PSIP Overlay Architecture"; IETF; IETF draft draft-matthews-p2psip-nats-and-overlays-01.txt; pp. 1-20.
Srisuresh et al; "State of Peer-to-Peer(P2P) Communication Across Network Address Translators(NATs)", Nov. 19, 2007; I ETF; I ETF draft for RFC 5128, draft-ietf-behave-p2p-state-06.txt; pp. 1-33.
PCT: International Search Report and Written Opinion for PCT/US2012/046026; Oct. 18, 2012; 6 pages.
Dunigan, Tom, "Almost TCP over UDP (atou)," last modified Jan. 12, 2004; retrieved on Jan. 18, 2011 from <http://www.csm.ornl.gov/~dunigan/net100/atou.html> 18 pgs.
PCT: International Preliminary Report on Patentability of PCT/US2011/040864; Jan. 3, 2013; 6 pgs.
PCT: International Preliminary Report on Patentability of PCT/US2011/041565; Jan. 10, 2013; 6 pgs.
PCT: International Preliminary Report on Patentability of PCT/US2011/049000; Feb. 26, 2013; 6 pgs.
PCT: International Preliminary Report on Patentability of PCT/US20111051877; Mar. 26, 2013; 5 pgs.
PCT: International Preliminary Report on Patentability of PCT/US20111055101; Apr. 16, 2013; 7 pgs.
Chathapuram, "Security in Peer-To-Peer Networks", Aug. 8. 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN—Simple Traversal of UDP Through NAT", Sep. 2002, XP015005058.
Salman A. Baset, et al, "An Analysis of The Skype Peer-To-Peer Internet Telephony Protocol", Department of Computer Science, Columbia University, New York, NY, USA, Sep. 15, 2004.
Singh et al., "Peer-to-Peer Internet Telephony Using SIP", Department of Computer Science, Columbia University, Oct. 31, 2004, XP-002336408.
Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.
International Search Report and Written Opinion of the International Searching Authority from PCT/US2008/078142, dated Mar. 27, 2009.
International Search Report and Written Opinion of the International Searching Authority from PCT/US2008/084950, dated Apr. 27, 2009.
Hao Wang, Skype VoIP service-architecture and comparison, In: INFOTECH Seminar Advanced Communication Services (ASC), 2005, pp. 4, 7, 8.

(56) References Cited

OTHER PUBLICATIONS

Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

PCT: International Preliminary Report on Patentability of PCT/US2008/084950; Jun. 1, 2010; 5 pgs.

\* cited by examiner

SYSTEM AND METHOD FOR VIRTUAL PARALLEL RESOURCE MANAGEMENT

BACKGROUND

The manner in which collaborative sharing occurs is typically serial in nature. Accordingly, what is needed are a system and method that addresses such issues.

BRIEF DESCRIPTION OF THE DRAWINGS

For a more complete understanding, reference is now made to the following description taken in conjunction with the accompanying Drawings in which.

DETAILED DESCRIPTION

Figure 1:
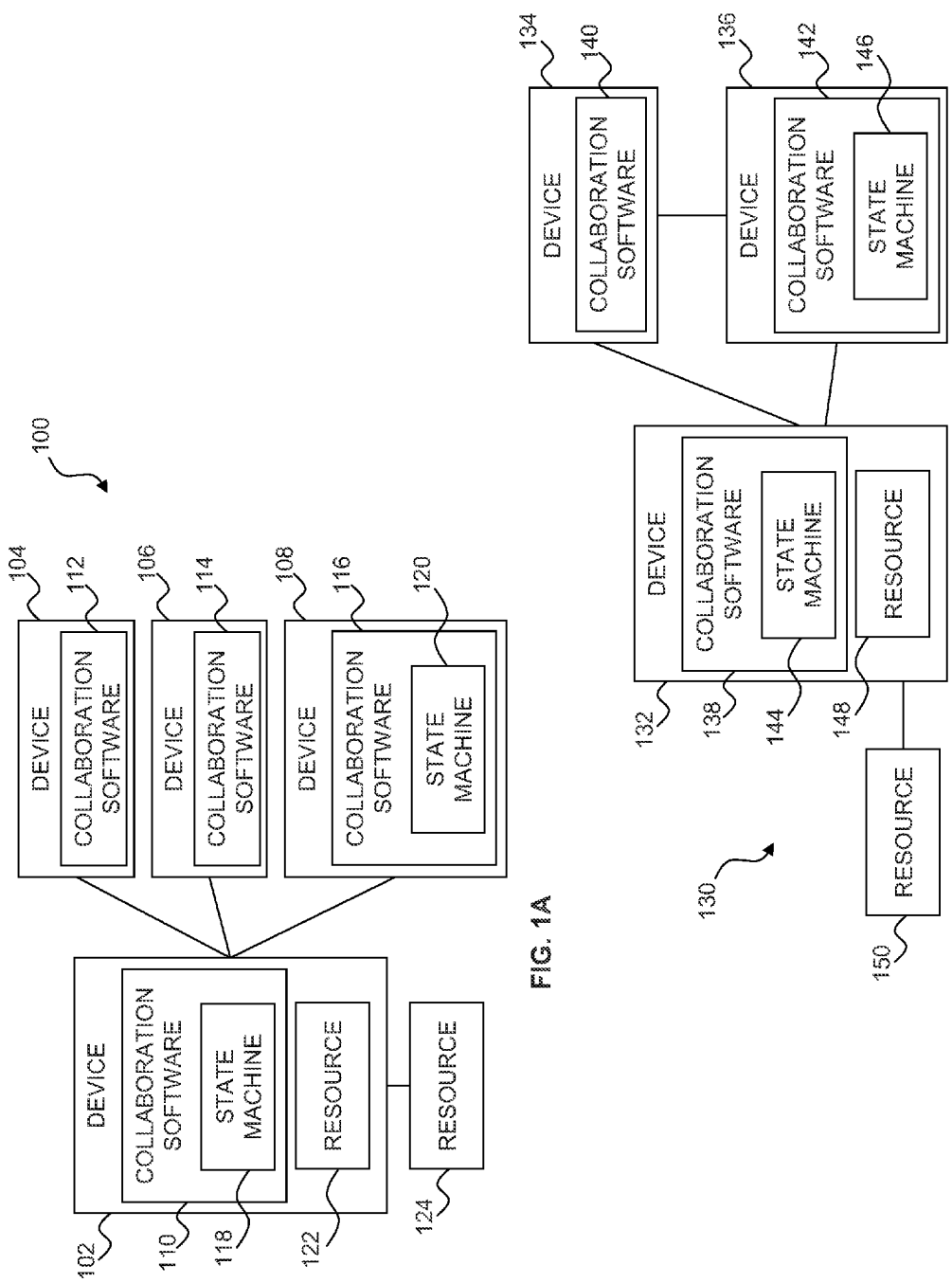
FIGS. 1A and 1B illustrate embodiments of collaborative environments.

It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1A, one embodiment of a collaborative environment 100 is illustrated with multiple devices 102, 104, 106, and 108. The devices 102, 104, 106, and 108 are involved in a collaborative resource sharing session in which one or more resources are shared in a manner that makes the sharing appear to be at least somewhat parallel from the perspective of users of the devices, but is not actually parallel in terms of access to the resource. As will be described below in greater detail, resource access is synchronized with some actions being executed in real time or near real time and other actions being buffered to provide virtual parallel access to multiple users even though only a single user actually has access to the resource in a given time frame. The user that has actual access to the resource(s) at a particular time may be referred to herein as being in control of the shared resource or as being the owner of the shared resource.

In the present example, the devices 102, 104, 106, and 108 include collaboration software 110, 112, 114, and 116, respectively, that includes software instructions needed to participate in the collaborative environment 100. The collaboration software 110, 112, 114, and 116 may be part of other software on the devices, or may be a stand-alone program. For example, the collaboration software 110, 112, 114, and 116 may be provided by functionality integrated with software that provides functionality other than collaboration, or may be part of a software program dedicated to collaboration. Accordingly, it is understood that the functionality in the present disclosure may be provided in many different ways and is not limited to the specific examples described herein.

In the present example, the device 102 includes a state machine 118 that controls resource sharing interactions among the devices 102, 104, 106, and 108 to enable the collaborative environment 100. Although shown as a single state machine, the state machine 118 may represent multiple state machines (e.g., a separate state machine for each device 102, 104, 106, and 108 that tracks the state of the corresponding device). For each device 102, 104, 106, and 108, the state machine 118 may track such states as whether that device currently has control of the shared resource (e.g., is the owner or is not the owner), whether it is gaining control, or whether it is losing control.

One or more of the other devices 104, 106, and/or 108 may also have a state machine, as demonstrated by the state machine 120 of the device 108. For example, the collaboration software may have a viewer version and a sharer version, with only the sharer version capable of providing state machine functionality. In such embodiments, a state machine on a single device may control the collaboration session. In other embodiments, all collaboration software may have a state machine, but only one state machine may be active for a particular collaboration session. In still other embodiments, all collaboration software may have a state machine and the state machines of two or more devices may be synchronized to provide the collaboration session. A single state machine may control multiple resources or a different state machine may be assigned to each resource.

Some variations may occur due to the particular collaborative environment 100, such as whether the devices 102, 104, 106, and 108 are communicating in a peer-to-peer manner or via a server, but the basic tracking mechanism of the state machine 118 may remain the same regardless of the environment. In the present example, the device 102 is operating as a server, although it is understood that the device 102 need not be a standalone server (e.g., the device 102 may be a peer-to-peer endpoint or a mobile device providing server capabilities in a client/server environment). Furthermore, the device 102 may still participate in the collaboration session and may be treated by the state machine 118 as any other device for purposes of resource access.

The device 102 includes or is coupled to one or more resources, which may include internal resources 122 (e.g., software) and external resources 124 (e.g., keyboard, mouse, display, printer, manufacturing equipment, medical equipment, diagnostics equipment, and/or any other type of resource to which the device 102 may be coupled either directly or via a network). It is understood that some overlap may occur between internal and external resources, as many external resources are controlled via software. For example, the physical casing of a mouse may be viewed as an external resource for purposes of description, but it is controlled and interacts with the user via a mouse pointer using software, which may be viewed as an internal resource. Accordingly, the terms "internal" and "external" are descriptive when referring to a particular resource and are not intended to limit a particular resource or its manner of operation. Access to the resource 122 and/or the resource 124 may be shared with the devices 104, 106, and 108 within the collaborative environment 100.

The collaborative environment 100 may be viewed as having a sharing device and one or more using (e.g., viewing) devices. The sharing device, which is the device 102 in the present example, is the device that actually has control of the resource(s) being shared and makes the resource available to the other devices. For example, if the resource being shared is an application, the sharing device 102 is the device on which the application is running. The using devices are the devices that use the shared resource provided by the sharing device, such as the devices 104, 106, and 108.

Referring to FIG. 1B, another embodiment of a collaborative environment 130 is illustrated with multiple devices 132, 134, and 136 that include collaboration software 138, 140, and 142, respectively. The device 132 includes a state machine 144. One or more of the devices 134 and 136 may also include a state machine, as illustrated by state machine 146 of the device 136. The device 132 includes one or more resources, such as resources 148 and/or 150. As these components are similar or identical to similar components described with respect to FIG. 1A, they are not described in detail in the present figure.

In the present example, the devices 102, 104, and 106 may all communicate with one another. For example, the device 134, rather than sending a message only to the device 132 as would occur in the client/server model of FIG. 1A, may also send a message to the device 136. Upon receipt of the message from the device 134, the device 136 may be configured to use the state machine 146, may be configured to update only certain information (e.g., a cursor position), or may wait for a message from the state machine 144 before taking any action. Accordingly, variations in messaging may occur depending on the communication structure used within a collaborative environment.

Figure 2:
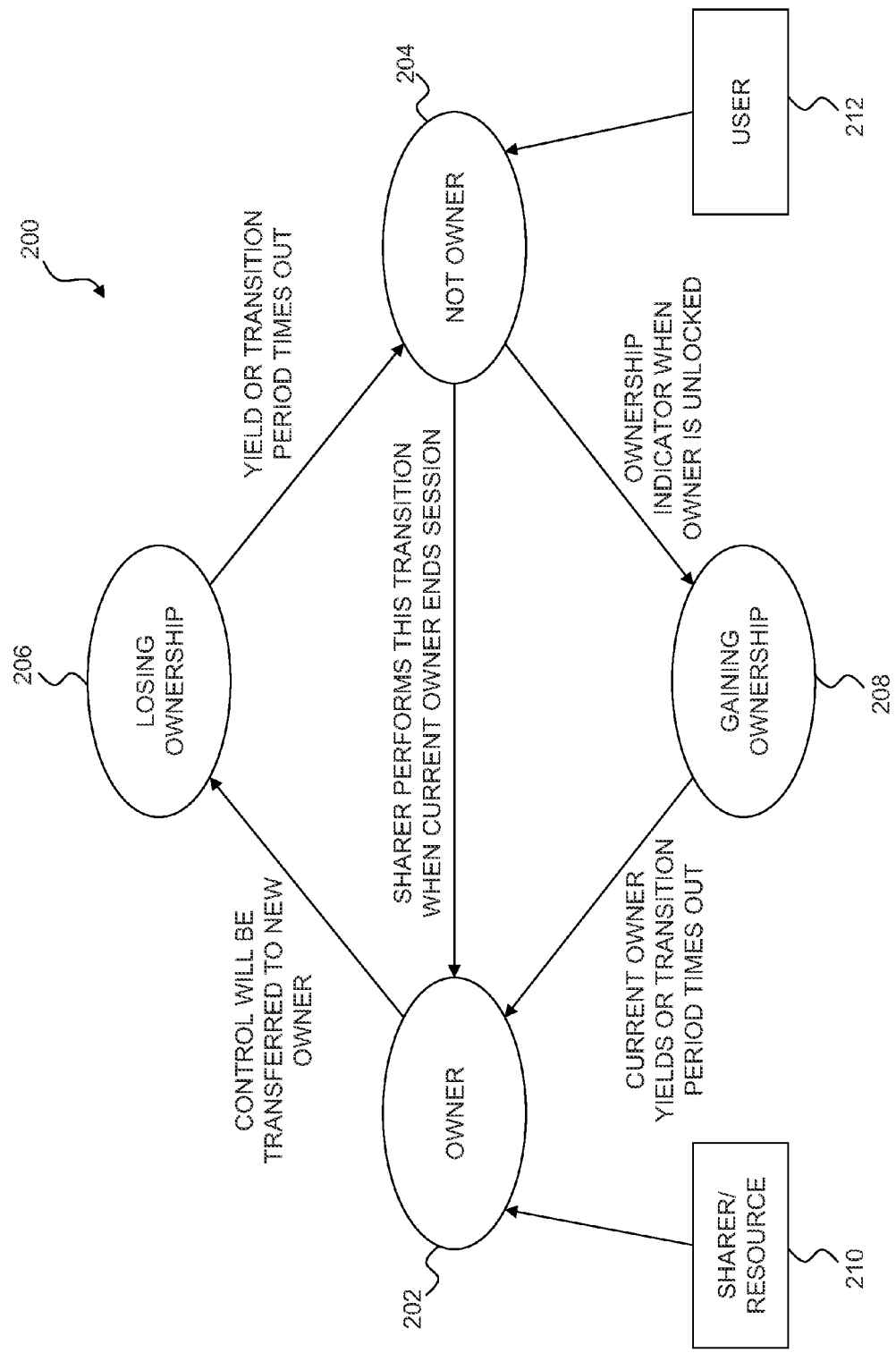
FIG. 2 illustrates one embodiment of a state machine that may be maintained by a device operating within an environment such as one of the collaborative environments of FIGS. 1A and 1B.

Referring to FIG. 2, one embodiment of a state diagram 200 illustrates states 202, 204, 206, and 208. The state diagram 200 may be implemented by the state machine 118 of FIG. 1A in order to provide the collaborative environment 100 in which other devices (e.g., the devices 104, 106, and 108) can share access to the resources 122 and/or 124. In the present example, the device 102 and resources 122 and/or 124 are represented as a sharer/resource 210. The other devices 104, 106, and 108 are represented as a user 212.

The state 202 is an "owner" state and represents a device that is currently in control of the resources 122 and/or 124. The "owner" state is a unique state in that there is only one owner at any given time. Generally, actions generated by a device in state 202 will be executed. It is noted that the sharer is generally treated as any other device by the state diagram 120, and hardware events such as mouse and keyboard events may be intercepted and handled in the same way as input from other devices. In this respect, the only difference between the sharer and users is that the sharer may have the ability to take control of the session away from everyone. The state 204 is a "not owner" state and represents a device that is not currently in control. Generally, actions generated by a device in state 204 will not be executed. Some exceptions may apply to certain actions or information generated in state 202 and/or state 204, as will be described below. Such exceptions may depend on the particular resource or resources being shared and configuration parameters governing the sharing.

The state 206 is a "losing ownership" state and represents a device that is transitioning from the "owner" of state 202 to the "not owner" of state 204. Generally, actions generated by a device in state 206 will be executed, although some exceptions may apply to certain actions. The state 208 is a "gaining ownership" state and represents a device that is transitioning from the "not owner" of state 204 to the "owner" of state 202. Generally, actions generated by a device in state 208 will be buffered and executed when the device becomes the owner.

The transition from the "not owner" state 204 to the "gaining ownership" of state 208 may be triggered by one or more types of events. For example, input in the form of mouse clicks, keyboard clicks, audio input, video input, and/or other types of input, including the execution of defined automated events, may serve to trigger the state transition from state 204 to state 208. Accordingly, the transition may be triggered in many different ways and may be configurable.

The transition periods that occur during state 206 and state 208 enable a parallel sharing process to occur. More specifically, assuming the existence of proper input, the direct execution of actions for one device and the buffering of actions for another device that are later executed enable at least two users to perform virtual parallel actions without causing any conflicts. This is illustrated below with respect to FIG. 3.

Figure 3:
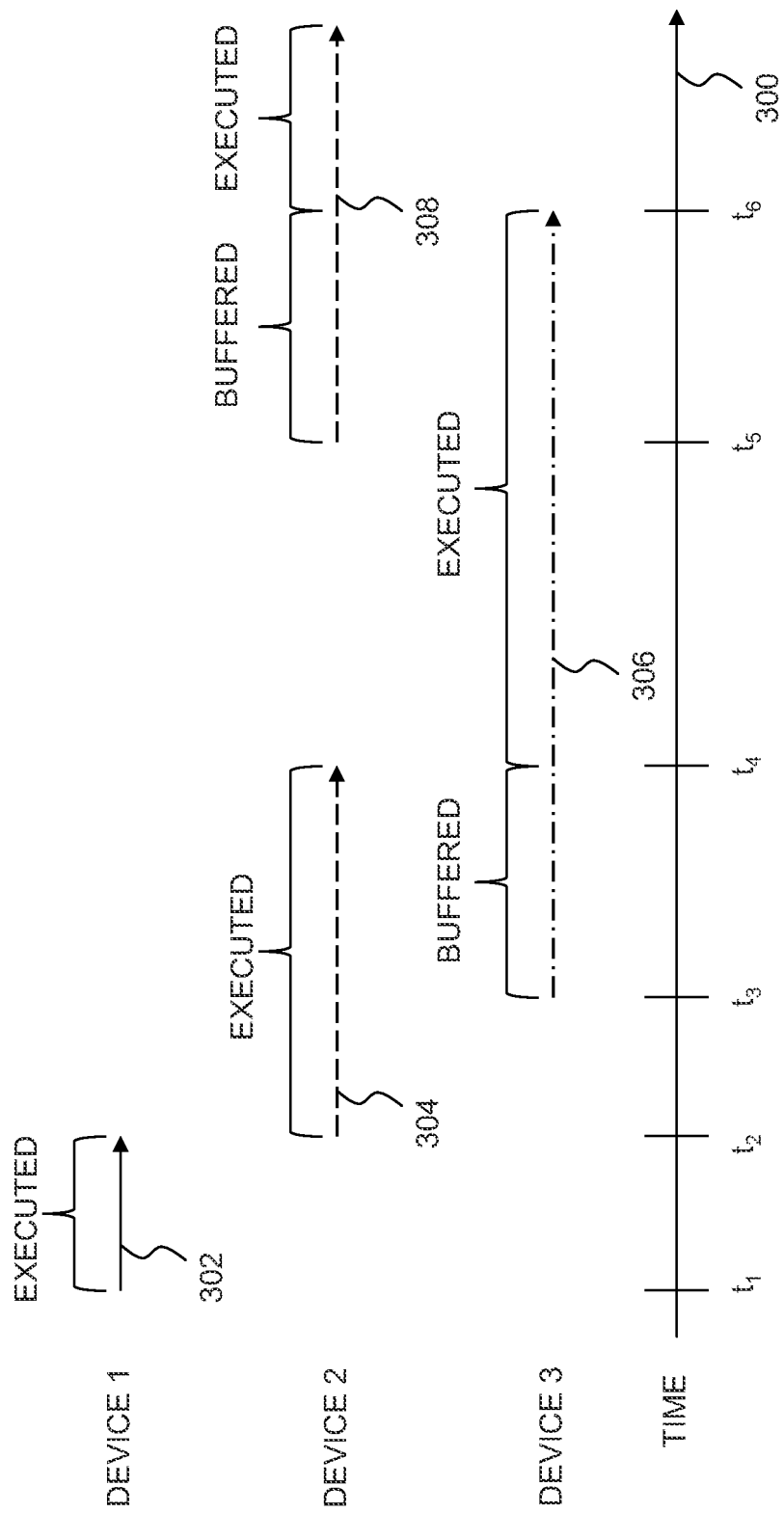
FIG. 3 illustrates one embodiment of a timeline showing virtual parallel access to a shared resource based on which device is currently in control of the shared resource.

With additional reference to FIG. 3, one embodiment of a timeline 300 illustrates the virtual parallel access of one or more resources by Device 1, Device 2, and Device 3. For purposes of example, Device 1 may be the device 102 of FIG. 1A, Device 2 may be the device 104, and Device 3 may be the device 106. The timeline 300 moves from left to right and includes six specific times $t_1$-$t_6$. Actions by Device 1 are represented by line 302, actions by Device 2 are represented by lines 304 and 308, and actions by Device 3 are represented by line 306.

From time $t_1$ to time $t_2$, Device 1 is in control and input from Device 1 is being executed. Input from Device 2 and Device 3 is being ignored and/or no input is being received from those devices. Device 1 is in the "owner" state 202. Device 2 and Device 3 are in the "not owner" state 204.

At time $t_2$, Device 2 requests control and Device 1 voluntarily hands control to Device 2 without going through a full transition period. From time $t_2$ to time $t_3$, Device 2 is in control and input from Device 2 is being executed. Input from Device 1 and Device 2 is being ignored and/or no input is being received from those devices. Device 2 is in the "owner" state 202. Device 1 and Device 3 are in the "not owner" state 204.

At time $t_3$, Device 3 requests control. Device 2 does not voluntarily hand control to Device 3 and a timer is started for the transition period. From time $t_3$ to time $t_4$, Device 2 is in control and input from Device 2 is being executed. Input from Device 1 is being ignored and/or no input is being received, and input from Device 3 is being buffered. Device 2 is in the "losing ownership" state 206. Device 1 is the "not owner" state 204. Device 3 is in the "gaining ownership" state 208.

It is understood that input may be buffered on the device sending the input as well as on the device receiving the input. For example, Device 3 is sending input to Device 1 (as the device 102 with the state machine) from time $t_3$ to time $t_4$ and that input is being buffered since Device 3 is not currently the owner. However, it may be desirable for Device 3 to buffer the input before it is sent. Such sending side buffering may be based on network characteristics (e.g., interpacket delay due to network latency) and/or a predefined delay local to Device 3. This sending side buffering enables Device 3 to send the input in a regulated manner (e.g., every twenty or forty milliseconds) rather than simply sending the input whenever it is detected (e.g., with a zero millisecond delay).

At time $t_4$, the transition period expires and control is automatically transferred from Device 2 to Device 3. From time $t_4$ to time $t_5$, Device 3 is in control and input from Device 3 is being executed. Buffered input received from Device 3 during the period between time $t_3$ and time $t_4$ may be executed during this time. Input from Device 1 and Device 2 is being ignored and/or no input is being received. Device 3 is in the "owner" state 202. Device 1 and Device 2 are in the "not owner" state 204.

At time $t_5$, Device 2 requests control. Device 3 does not voluntarily hand control to Device 2 and a timer is started for the transition period. From time $t_5$ to time $t_6$, Device 3 is in control and input from Device 3 is being executed. Input from Device 1 is being ignored and/or no input is being received, and input from Device 2 is being buffered. Device 3 is in the "losing ownership" state 206. Device 1 is the "not owner" state 204. Device 2 is in the "gaining ownership" state 208.

In some embodiments, there may be a waiting period during which the device that was recently in control (e.g., Device 2) is not allowed to again take control. In other embodiments, the waiting period may be applied to any device, not just a device that was recently in control. In still other embodiments, there may be no such limits. It is understood that requests for control may be queued. For example, if Device 1 asks for control just after time $t_5$, its request may be queued and executed after Device 2 takes control. In such cases, there may be a waiting period between the time Device 2 takes control and the time the request by Device 1 is executed. This waiting period ensures that Device 2 has time to accomplish more than could be accomplished if the request by Device 1 was executed as soon as Device 2 takes control. In other embodiments, there may be no such waiting period and the request by Device 1 may be executed as soon as Device 2 takes control. In this case, Device 2 would have the transition time before it takes control from Device 3 and the transition time before it loses control to Device 1. It is understood that such options may be configurable within the collaboration software 110.

At time $t_6$, the transition period expires and control is transferred from Device 3 to Device 2. At time $t_6$, Device 2 is in control and input from Device 2 is being executed. Buffered input received from Device 2 during the period between time $t_5$ and time $t_6$ may be executed during this time. Input from Devices 1 and 3 is being ignored and/or no input is being received. Device 2 is in the "owner" state 202. Device 1 and Device 3 are in the "not owner" state 204.

Accordingly, during the transition times that occur between time $t_3$ and time $t_4$ and between time $t_5$ and time $t_6$, two devices may access the shared resource in a virtual parallel manner. Buffering input from a device that is going to gain control and later executing the buffered input after the device gains control enables such virtual parallel access without causing a conflict with the device that has access before the transition occurs.

Referring again to FIG. 2, in some embodiments, there may be a transition directly from the "not owner" state 204 to the "owner" state 202 when a device (other than the sharer) that is in control abruptly ends its participation in the session (e.g., leaves or is disconnected). This transition enables the sharer to regain control of the session since the state machine 200 will not enter the transition steps of state 206 and state 208.

In the present example, the state machine 118 maintains a copy of the state machine for each of the devices 102, 104, 106, and 108, even if a particular device has not requested control. However, devices that cannot take control (e.g., do not have permission or are not properly configured to take control) may not have a corresponding state machine. In other embodiments, a state machine may exist only for devices that have requested control. For example, when a device requests control for the first time, the state machine 118 may create a state machine for that device.

In a more detailed example of the state diagram 200, assume that the resources 122 and 124 include an application that allows editing (e.g., a word processor or spreadsheet application), a keyboard, and a mouse. In this example, it is understood that the keyboard and mouse are not physically shared, but the control that they provide (e.g., via actions received as input via the device 102) may be shared in such a way that they can be virtually shared and controlled, with the device in control being able to edit or otherwise manipulate the application. Other devices' mouse cursors may be represented by virtual cursors (e.g., faded, dotted, or otherwise denoted as not representing the cursor in control). The actual resource being shared may be viewed as the application or display (which may be shared by sending display information to the devices 104, 106, and 108), the mouse and keyboard (which may be shared by sending their actions, such as cursor movements and keystrokes, to the devices 104, 106, and 108), or a combination of both the application/display and the keyboard/mouse events.

In the present embodiment, the device 102 is the sharer and the devices 104, 106, and 108 are viewers, although any of the devices can be in control. Input takes the form of keyboard and mouse events, which are injected into the collaboration session by whichever device is the current owner. Mouse movements by non-owners may be shown as virtual cursors and keyboard events are generally rejected unless they represent a control request or are being buffered following a control request.

A non-owner may become an owner by clicking the left mouse button. In other words, when in the "not owner" state 204, a left mouse button (LMB) down event may trigger the ownership transition process previously described. During the transition process, keyboard events from the incoming owner will be buffered and not reflected on the display. When that device becomes the owner, the real mouse cursor will be moved to the position of the virtual mouse cursor of the new owner and the buffered keyboard events will be executed. For example, the real mouse cursor may be moved to a particular cell of a spreadsheet and typed input may appear. This information will be sent to the non-owning devices. The previous owner will be assigned a virtual mouse cursor positioned where their mouse was located when they lost ownership.

In some embodiments, the current owner may be notified that they are going to lose ownership. The current owner may then yield control voluntarily (e.g., prior to the end of the transition period) or may wait until they automatically lose control at the end of the transition period. In still other embodiments, the current owner may have temporarily locked ownership and may prevent an ownership change by, for example, holding down the left mouse button. This lock enables the current owner to finish before being interrupted, and may continue for as long as the left mouse button is held down (e.g., a left mouse button up event may unlock the owner state), may continue for a defined time period (e.g., there may be a maximum lock time allowed by the state machine 118 even if the left mouse button is held down), and/or until another defined event occurs. In some embodiments, the owner may be unable to lock ownership after being notified of an impending transition (e.g., left mouse button events generated by the owner may be ignored or the lock option may be otherwise disabled).

For example, assume that the application is Excel (the spreadsheet program produced by Microsoft Corp. of Seattle, Wash.). The current owner may be typing something into a cell when they are notified that they are going to lose control. The transition period gives them some time to finish what they are typing, while also allowing the incoming owner to click on a cell and begin typing. This transition period enables the two users to perform parallel editing, although it is virtual in nature since the incoming owner's input will not appear until they gain ownership.

It is understood that the transition period may be any length of time and may be configurable. Generally, the transition period will be defined to provide enough time for a particular action or set of actions to be completed (e.g., typing into a cell), but not so long as to disrupt an active sharing of the resource. For example, a transition period between five and ten seconds may be used in the Excel example, although any other times may be set. Different resources and/or devices may be given unique transition periods in some embodiments. For example, a user of the device 102 may be leading the collaboration session and may be given a longer transition period to ensure he is able to complete typing. By default, however, all transition periods may be assigned the same amount of time.

In the current example where the state machine 118 handles information for all of the devices in the collaboration session, the state machine 118 may use a table or another data structure to track each of the devices in the collaboration session. One example of such a table is shown below as Table 1.

TABLE 1

| DEVICE | STATE | CURRENT CURSOR POSITION | MOUSE AND KEYBOARD EVENTS | OWNER LOCKED? |
|---|---|---|---|---|
| 102 | Not owner | x1, y1 | N/A | N/A |
| 104 | Not owner | x2, y2 | N/A | N/A |
| 106 | Owner | x3, y3 | List of events | No |
| 108 | Not owner | x4, y4 | N/A | N/A |

For each device 102, 104, 106, and 108, Table 1 tracks the current state, the current cursor position, a list of mouse and keyboard events (including buffered events for a device gaining ownership), and whether the ownership is locked (e.g., whether the left mouse button is down) to prevent an ownership change. It is understood that the information in Table 1 may change depending on the nature of the resource or resources being shared. The sharer may also keep track of other information, such as the identity of the current owner and the next owner, and may maintain a timer for transitions.

From the perspective of the other devices 104, 106, and 108, the collaboration software may not be aware of parallel access operations or even their own mouse states. For example, the devices 104, 106, and 108 may simply send their mouse and keyboard events to the device 102 (e.g., the server hosting the collaboration session via the state machine 118) as though they are controlling the device 102.

Generally speaking, actual sharing of the resources (e.g., the display) of the device 102 uses a protocol that is able to provide the needed functionality. Such functionality includes enabling the sharer to send its screen display to the viewers and enabling the sharer to allow specific viewers to control the sharer's display. The functionality may also include enabling viewers to send mouse and keyboard events to the sharer and enabling the sharer to identify the source device for a particular received event. The functionality may also include enabling mouse position synchronization between the sharer and the viewers. For example, if the viewer sends its mouse position as (x,y), the sharer needs to be able to reflect this by moving the virtual or real cursor (depending on the state of ownership of the viewer) to (x,y).

In the present embodiment where the implementation depends on the sharer, no specific special extensions may be needed. However, certain messages may be useful to provide more transparency in the collaboration session. For example, the sharer may send a message to a viewer to notify the viewer of their state. Such a message may be sent to the viewer each time the viewer's state changes. This enables the viewer (e.g., the device) to notify the user of the device that it is losing ownership. Another message may be sent from a viewer to the sharer if the viewer explicitly yields ownership. Yet another message may be sent from the sharer to all viewers to identify a new owner. This information may then be presented to users of the viewing devices.

Figure 4:
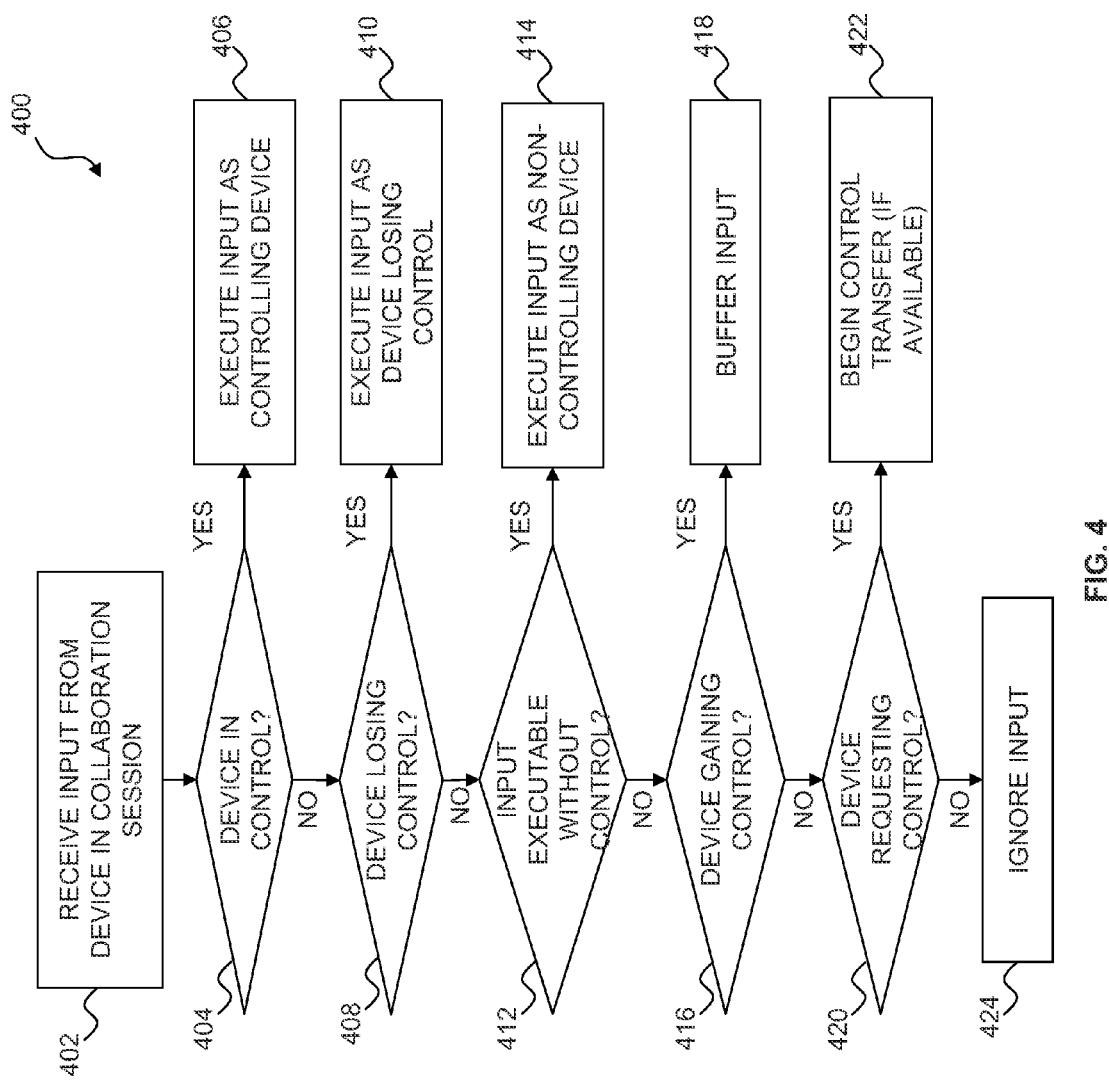
FIG. 4 illustrates a flow chart of one embodiment of a process by which a device running a state machine within an environment such as one of the collaborative environments of FIGS. 1A and 1B may handle received input.

Referring to FIG. 4, a flow chart 400 illustrates one embodiment of a process that may be executed by a device with a state machine, such as the device 102 of FIG. 1A with the state machine 118. In the present example, the state machine 118 handles all coordination of ownership and transitions. The process 400 may be used to handle input received from one or more of the devices 102, 104, 106, and/or 108.

In step 402, input is received from a device (e.g., the device 104 of FIG. 1A) in a collaboration session. As described previously, input may be handled by the state machine 118 in a similar manner for all devices, so the state machine 118 may not differentiate between input from the device 102 or input from the other devices 104, 106, and 108. In some embodiments, there may be defined input from the device 102 that overrides all other input regardless of whether the device 102 is the current owner. This enables the user of the device 102 to regain control of the collaboration session at any time. Generally however, input from the device 102 will not be prioritized unless a preference is defined for the state machine 118 giving priority to the device 102. It is understood that various priority configurations may be available, with particular devices being given priority over other devices.

In step 404, a determination is made as to whether the device from which the input was received is currently in control. For example, the method 400 may determine if the device is in the "owner" state 202. If the device is in control, the method 400 moves to step 406, where the input is executed (e.g., an action is performed) with the input device viewed as a controlling device with any parameters defined for the state 202. In some embodiments, the state 202 may have the least number of limitations on input, but may still be restricted to input that is compatible with the application being shared. Accordingly, the input will likely not be able to launch an application, but may access and use some or all of the functionality of the application being shared. In other embodiments, some functionality may be limited. For example, if the application provides scripting functions, the physical sharer (e.g., the device 102) may choose to allow or limit access to the scripting functions. If the device is not in control as determined in step 404, the method 400 moves to step 408.

In step 408, a determination is made as to whether the device from which the input was received is currently losing control. For example, the method 400 may determine if the device is in the "losing ownership" state 206. If the device is losing control, the method 400 moves to step 410, where the input is executed (e.g., an action is performed) with the input device viewed as a device that is losing control with any parameters defined for the state 206. In some embodiments, the state 206 may be limited somewhat, such as being unable to close the application, launch or otherwise bring another program into the foreground, and/or perform certain other functions. If the device is not losing control as determined in step 408, the method 400 moves to step 412.

In step 412, a determination is made as to whether the input is executable without needing control. For example, the method 400 may determine if the input reflects mouse movement of a virtual mouse cursor. If the input is executable without needing control, the method 400 moves to step 414, where the input is executed (e.g., an action is performed) with the input device viewed as a device that is not in control. It is understood that events such as mouse movements may be treated differently from keyboard input, in which case steps 412 and 414 may not be needed. If the input is not executable without control as determined in step 412, the method 400 moves to step 416.

In some embodiments, steps 412 and 414 may not occur. Some events may be handled outside of the state machine 118 (e.g., out-of-band) and would not be handled in the method 400. For example, if cursor movements were handled by another component and not by the state machine 118, steps 412 and 414 would not be needed to handle those movements. Accordingly, steps 412 and 414 may be used only if the state machine 118 is configured to handle events that are executable without control.

In step 416, a determination is made as to whether the device from which the input was received is currently gaining control. For example, the method 400 may determine if the device is in the "gaining ownership" state 208. If the device is gaining control, the method 400 moves to step 418, where the input is buffered. If the device is not gaining control as determined in step 416, the method 400 moves to step 420.

In step 420, a determination is made as to whether the device from which the input was received is currently requesting control. If the device is requesting control, the method 400 moves to step 422, where the control transition is initiated. If the ownership cannot be changed (e.g., if ownership is locked or otherwise unavailable), the method 400 may execute whatever process is defined for such an event. Such processes may include notifying the device from which the input was received that the ownership transfer request failed, buffering the request until ownership becomes available or for a defined period of time, and/or taking other actions. If the device is not requesting control as determined in step 420, the method 400 moves to step 424. In step 424, the input is ignored.

Figure 5:
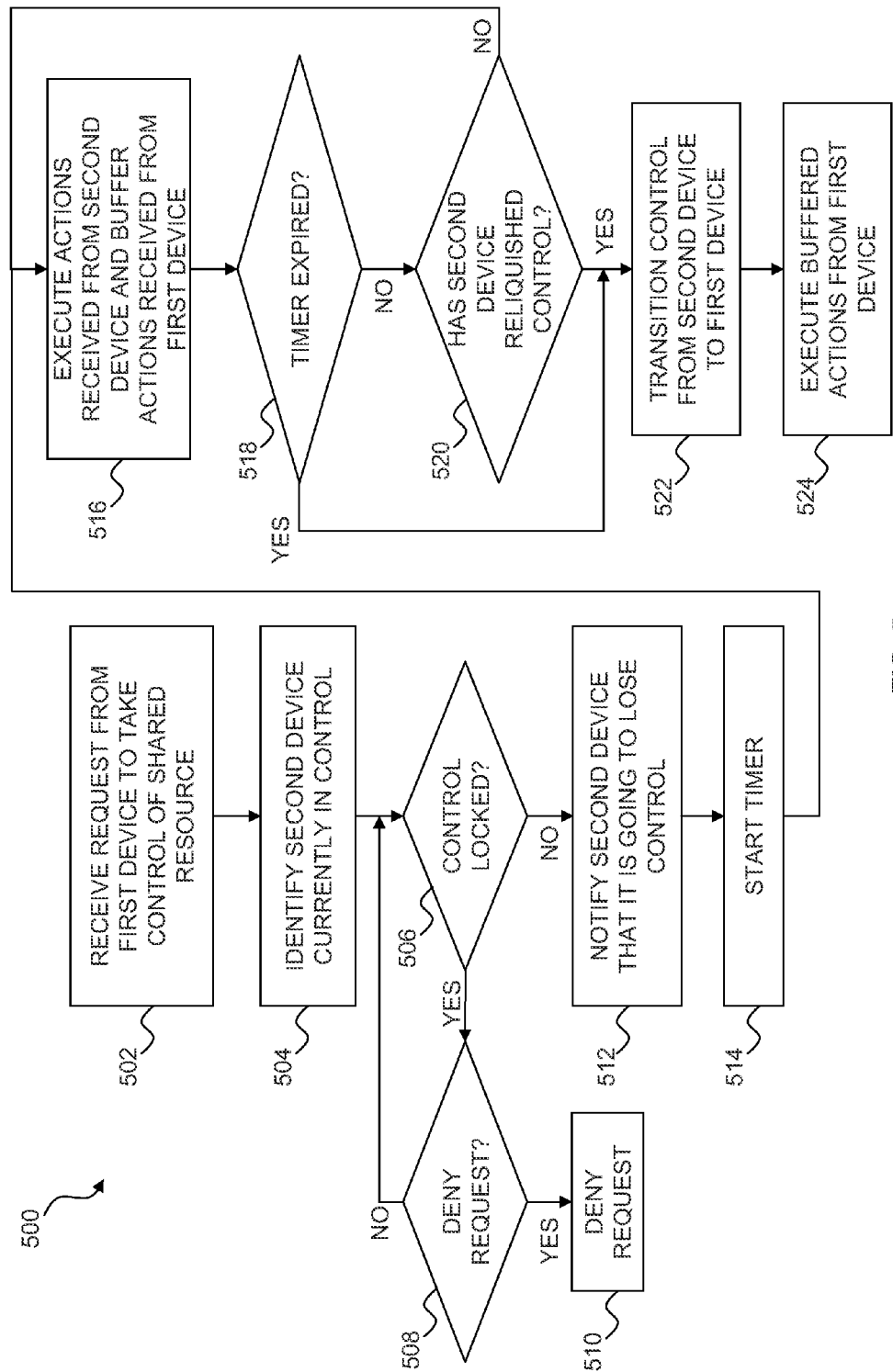
FIG. 5 illustrates a flow chart of one embodiment of a process by which a device running a state machine within an environment such as one of the collaborative environments of FIGS. 1A and 1B may handle a request for ownership.

Referring to FIG. 5, a flow chart 500 illustrates one embodiment of a process that may be executed by a device with a state machine, such as the device 102 of FIG. 1A with the state machine 118. In the present example, the state machine 118 handles all coordination of ownership and transitions. The process 500 may be used to handle a request for ownership received from one or more of the devices 102, 104, 106, and/or 108. For purposes of illustration, an example of a table listing each device's state is provided and the previously described example using cursor locations and mouse/keyboard events is used. The initial table contains the following information as shown in Table 2 below, with the device 106 currently being in control.

TABLE 2

| DEVICE | STATE | CURRENT CURSOR POSITION | MOUSE AND KEYBOARD EVENTS | OWNER LOCKED? |
|---|---|---|---|---|
| 102 | Not owner | x1, y1 | N/A | N/A |
| 104 | Not owner | x2, y2 | N/A | N/A |
| 106 | Owner | x3, y3 | List of events | No |
| 108 | Not owner | x4, y4 | N/A | N/A |

In step 502, a request is received from a device (e.g., the device 104 of FIG. 1A) that wants to take control of a shared resource in the collaboration session. In step 504, a second device (e.g., the device 106) is identified as currently being in control. In step 506, a determination may be made if control (e.g., ownership) is locked. If control is locked, the method 500 moves to step 508, where a determination may be made as to whether the request for control is to be denied. For example, a timer may be set and the lock may remain in place until the timer expires or the method 500 may simply wait the current lock to be removed (e.g., via a left mouse button up event). Alternatively, the collaboration software 110 may be configured to deny the request and require that the request be resubmitted. Regardless of the parameters on which the determination of step 508 may be based, if the request is not denied, the method 500 returns to step 506. If the request is denied, the method 500 moves to step 510 and denies the request. It is understood that the ability to lock ownership may not be available in some embodiments, in which case steps 506, 508, and 510 may be omitted. If control is not locked as determined in step 506, the method 500 moves to step 512.

In step 512, the second device is notified that it is going to lose control. The notification may include an amount of time remaining or another indicator of the impending loss of control. In step 514, a timer is started for the transition period. The table may now contain the following information as shown in Table 3 below.

TABLE 3

| DEVICE | STATE | CURRENT CURSOR POSITION | MOUSE AND KEYBOARD EVENTS | OWNER LOCKED? |
|---|---|---|---|---|
| 102 | Not owner | x1, y1 | N/A | N/A |
| 104 | Gaining ownership | x2, y2 | List of buffered events | N/A |
| 106 | Losing ownership | x3, y3 | List of events | No |
| 108 | Not owner | x4, y4 | N/A | N/A |

In step 516, which is during the transition period, input received from the second device is executed and input received from the requesting device is buffered. In step 518, a determination is made as to whether the timer has expired. If the timer has expired as determined in step 518, the method 500 moves to step 522, where control is transitioned from the second device to the first device. If the timer has not expired as determined in step 518, the method 500 continues to step 520.

In step 520, a determination is made as to whether the second device has relinquished control. For example, in response to step 512, the second device may voluntarily relinquish control prior to the expiration of the timer. If the second device has not relinquished control, the method 500 returns to step 516. If the second device has relinquished control, the method 500 continues to step 522, where control is transitioned from the second device to the first device. Following step 522, the method 500 moves to step 524, where any actions that were buffered for the first device are executed. The table may now contain the following information as shown in Table 4 below.

TABLE 4

| DEVICE | STATE | CURRENT CURSOR POSITION | MOUSE AND KEYBOARD EVENTS | OWNER LOCKED? |
|---|---|---|---|---|
| 102 | Not owner | x1, y1 | N/A | N/A |
| 104 | Owner | x2, y2 | List of events | No |
| 106 | Not owner | x3, y3 | N/A | N/A |
| 108 | Not owner | x4, y4 | N/A | N/A |

Figure 6:
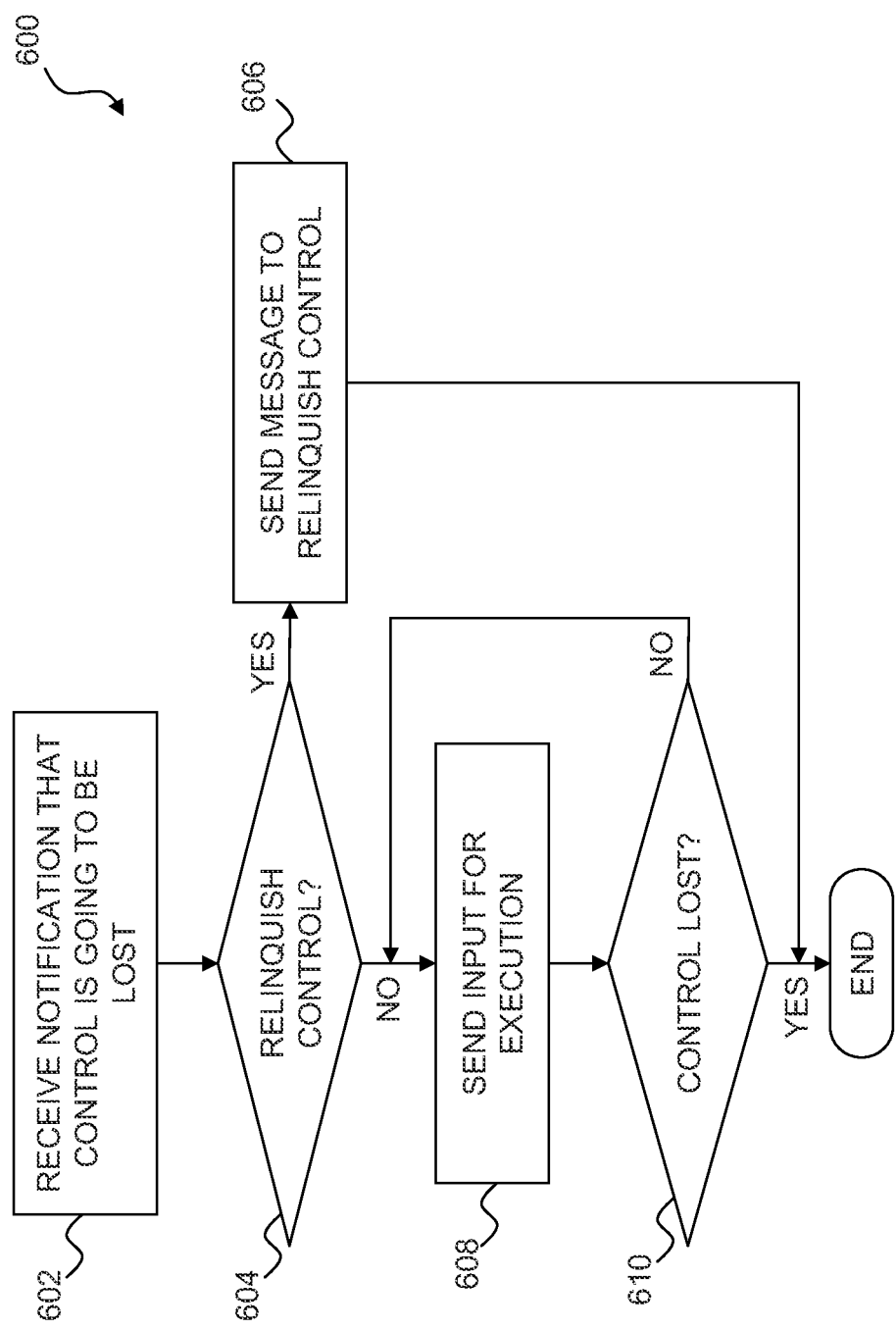
FIG. 6 illustrates a flow chart of one embodiment of a process by which a device within an environment such as one of the collaborative environments of FIGS. 1A and 1B may handle a notification that it is going to lose control of a shared resource.

Referring to FIG. 6, a flow chart 600 illustrates one embodiment of a process that may be executed by a device that is currently in control of a shared resource in a collaboration session. The device may include a state machine, such as the device 102 of FIG. 1A with the state machine 118, or may interact with a state machine located on another device. The process 500 may be used to handle a notification that control is going to be lost.

In step 602, a notification is received that control is going to be lost. The notification may include information such as an amount of control time remaining. In step 604, a determination may be made as to whether the user of the device wants to relinquish control. For example, a pop up box may appear on a display with a question such as "Relinquish control?" and the user may be able to select "Yes" or "No" as an answer. In other embodiments, the user may simply ignore the pop up box and the device will understand that as a "no" response. It is understood that some embodiments may not provide an option for relinquishing control. If the determination of step 604 indicates that control is to be relinquished, the method 600 moves to step 606. In step 606, a message is sent indicating that control has been relinquished. If the determination of step 604 indicates that control is not to be relinquished, the method 600 moves to step 608.

In step 608, input may be sent for execution. In step 610, a determination may be made as to whether control has been lost. For example, the determination may identify whether the transition period has timed out. This may be determined based on a message received from the state machine 118, based on an internal timer on the device losing control, and/or based on one or more other processes. If the determination indicates that control has not been lost, the method 600 may return to step 608 as shown or, in some embodiments, to step 604. If the determination indicates the control has been lost, the method 600 may end.

Figure 7:
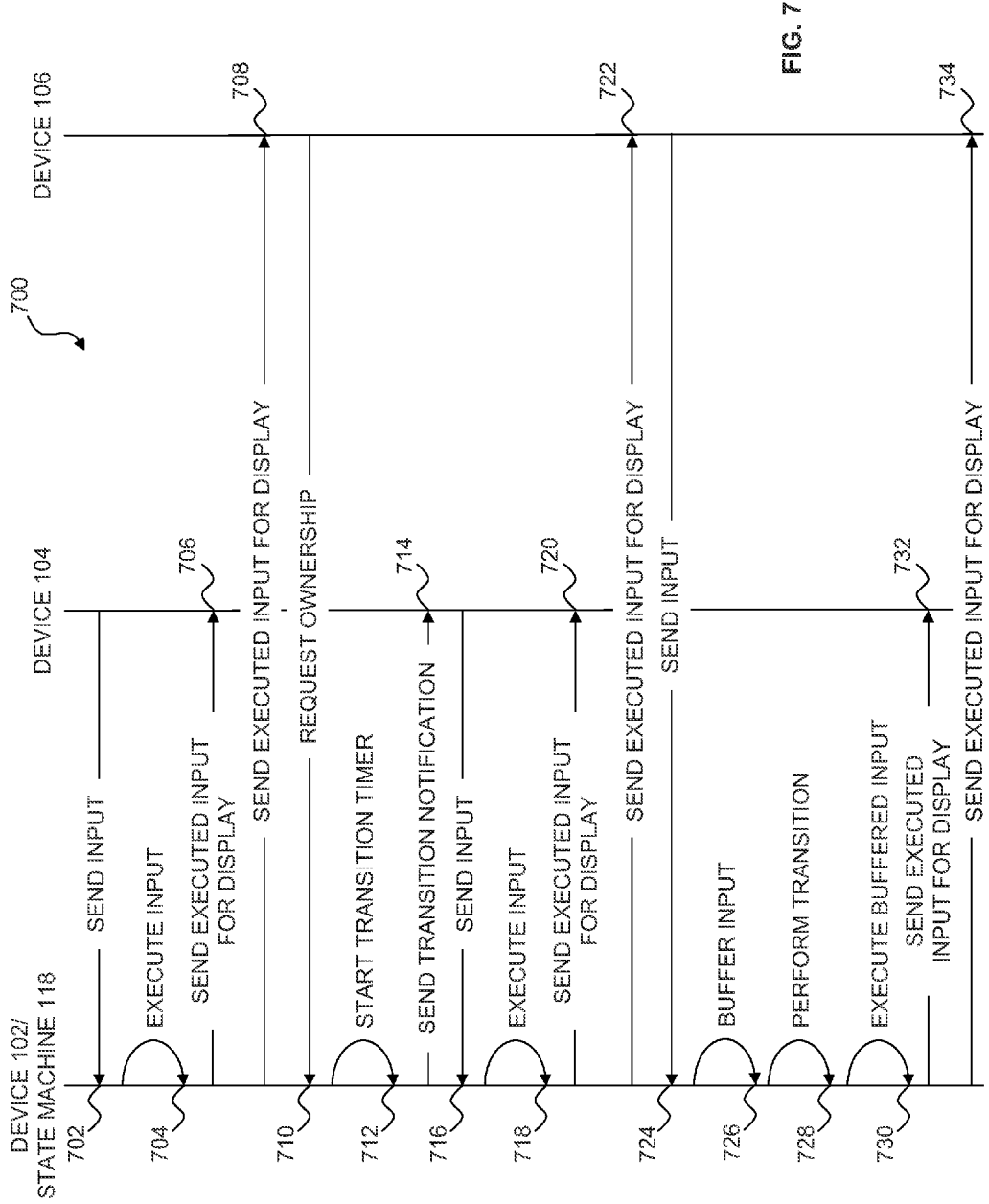
FIG. 7 illustrates a sequence diagram of one embodiment of a process that may be executed to manage access to a shared resource within an environment such as one of the collaborative environments of FIGS. 1A and 1B.

Referring to FIG. 7, a sequence diagram 700 illustrates one embodiment of a process that may be executed between multiple devices during a collaboration session. The present example includes the device 102 with the state machine 118, the device 104, and the device 106 of FIG. 1A. For purposes of illustration, a collaboration session is underway and the device 104 is in control. The state machine 118 is tracking the state and other information for each of the devices 102, 104, and 106.

In step 702, the device 104 sends input to the device 102. As noted previously, this input may be buffered by the device 104 prior to sending based on network characteristics and/or a locally defined delay. As the device 104 is currently in control, the input is executed in step 704. The executed input is sent to the device 104 for display in step 706 and sent to the device 106 for display in step 708. As with the device 104, this executed input may be buffered by the device 102 prior to sending based on network characteristics and/or a locally defined delay. It is noted that sending the executed input to both of the devices 104 and 106 occurs in the client/server model of FIG. 1A and may be handled differently in other environments. For example, in some embodiments, the executed input may not be sent to the device 104 (e.g., if the device 104 has its own state machine that is synchronized with the state machine of the device 102).

In step 710, the device 106 sends a request for ownership to the device 102. In step 712, a transition timer is started and, in step 714, a transition notification message is sent to the device 104. In steps 716, 718, 720, and 722, which occur during the transition period, the device 104 may continue sending input to the device 102, that input may be executed, and the executed input may be sent to the devices 104 and 106. In step 724, which occurs during the transition period, the device 106 sends input to the device 102. This input is buffered in step 726.

In step 728, the transition is performed, with the device 106 replacing the device 104 as the current owner. In step 730, the buffered input is executed. In steps 732 and 734, the executed input is sent to the devices 104 and 104 for display.

Figure 8:
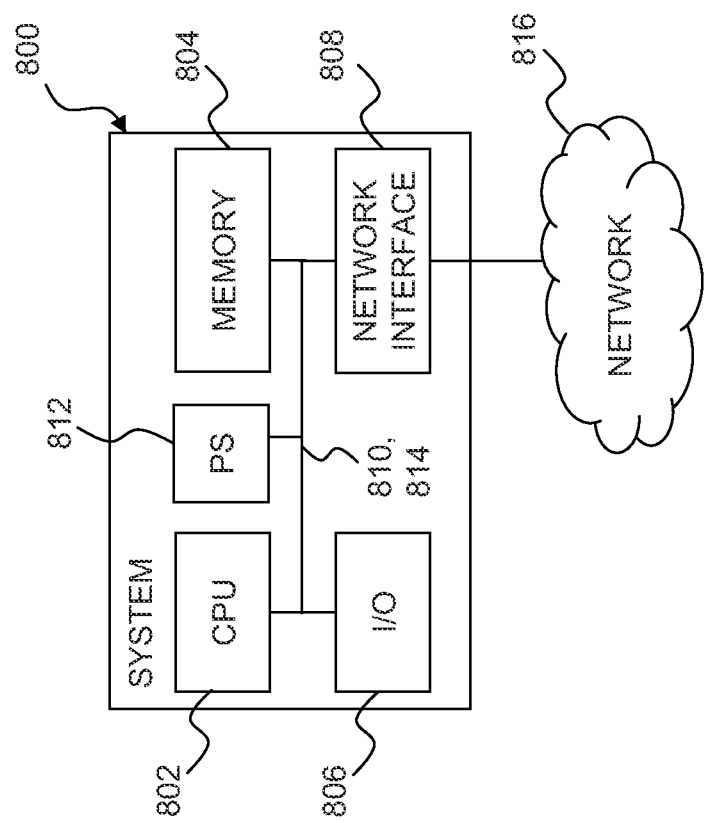
FIG. 8 illustrates one embodiment of a system that may be used as a device within an environment such as one of the collaborative environments of FIGS. 1A and 1B.

Referring to FIG. 8, one embodiment of a system 800 is illustrated. The system 1100 is one possible example of a device such as the device 102 of FIG. 1A. Embodiments of the device 102 include cellular telephones (including smart phones), personal digital assistants (PDAs), netbooks, tablets, laptops, desktops, workstations, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. It is understood that the device 102 may be implemented in many different ways and by many different types of systems, and may be customized as needed to operate within a particular environment.

The system 800 may include a controller (e.g., a central processing unit ("CPU")) 802, a memory unit 804, an input/output ("I/O") device 806, and a network interface 808. The components 802, 804, 806, and 808 are interconnected by a transport system (e.g., a bus) 810. A power supply (PS) 812 may provide power to components of the computer system 800, such as the CPU 802 and memory unit 804, via a power system 814 (which is illustrated with the transport system 810 but may be different). It is understood that the system 800 may be differently configured and that each of the listed components may actually represent several different components. For example, the CPU 802 may actually represent a multi-processor or a distributed processing system; the memory unit 804 may include different levels of cache memory, main memory, hard disks, and remote storage locations; the I/O device 806 may include monitors, keyboards, and the like; and the network interface 808 may include one or more network cards providing one or more wired and/or wireless connections to a network 816. Therefore, a wide range of flexibility is anticipated in the configuration of the computer system 800.

The system 800 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and embedded devices depending on the use of the system 800. The operating system, as well as other instructions, may be stored in the memory unit 804 and executed by the processor 802. For example, if the system 800 is the device 102, the memory unit 804 may include instructions for the state machine 118 and for performing some or all of the message sequences and methods described herein.

While the preceding description shows and describes one or more embodiments, it will be understood by those skilled in the art that various changes in form and detail may be made therein without departing from the spirit and scope of the present disclosure. For example, various steps illustrated within a particular flow chart or sequence diagram may be combined or further divided. In addition, steps described in one flow chart or diagram may be incorporated into another flow chart or diagram. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method comprising:
receiving, by a first device of a plurality of devices involved in a collaboration session that uses a shared resource, first input from a second device of the plurality of devices, wherein the first input represents a request to take control of the shared resource;
determining, by the first device, that a third device of the plurality of devices is currently in control of the shared resource;
receiving, by the first device, a locked indicator prior to starting a timer, wherein the locked indicator signifies that control cannot be transferred from the third device;
receiving, by the first device, an unlocked indicator following the receipt of the locked indicator, wherein the unlocked indicator signifies that control can be transferred from the third device and wherein the timer is started after receiving the unlocked indicator;
starting the timer, by the first device, wherein control of the shared resource will automatically pass from the third device to the second device when a time period defined by the timer expires;
executing, by the first device, second input received from the third device after the timer has been started and before the time period expires, wherein the second input represents at least one action to be taken using the shared resource;
sending, by the first device, a result obtained by executing the at least one action represented by the second input to each of the plurality of devices;
buffering, by the first device, third input received from the second device after the timer has been started and before the time period expires, wherein the third input represents at least one action to be taken using the shared resource; and
executing, by the first device, the at least one action represented by the third input after control is passed from the third device to the second device;
sending, by the first device, a result obtained by executing the at least one action represented by the third input to each of the plurality of devices;
receiving, by the first device, fourth input from the second device, wherein the fourth input is received before the first input and while the third device is in control of the shared resource, and wherein the fourth input represents at least one action to be taken using the shared resource; and
ignoring, by the first device, the fourth input.

2. The method of claim 1 further comprising determining, by the first device, whether the second input includes a restricted action, wherein the restricted action is ignored and not executed.

3. The method of claim 1 wherein the first device is sharing the shared resource, the method further comprising taking control of the shared resource from any other device of the plurality of devices that currently has control.

4. The method of claim 1 further comprising sending, by the first device, a message to the plurality of devices to inform the plurality of devices that the second device is now in control of the shared resource.

5. The method of claim 1 further comprising sending, by the first device, a message to the third device indicating that the third device will lose control of the shared resource when the time period expires.

6. The method of claim 1 further comprising receiving, by the first device, a message from the third device indicating that the third device relinquishes control to the second device prior to the expiration of the time period.

7. The method of claim 1 further comprising taking control of the shared resource, by the first device, after control is passed from the third device to the second device and the second device leaves the collaboration session without passing control to another device of the plurality of devices.

8. The method of claim 1 wherein access to the shared resource by the first device is handled by the first device in an identical manner as access by any other device of the plurality of devices.

9. The method of claim 1 wherein the shared resource is user-controllable and wherein the first, second, and third input correspond to user input.

10. The method of claim 9, wherein the shared resource includes a user interface device.

11. The method of claim 1 further comprising:
receiving, by the first device, fourth input from the third device, wherein the fourth input represents a request to take control of the shared resource after control of the resource has passed to the second device; and
determining whether a cooling off period has expired, wherein the second device cannot gain control of the shared resource until the cooling off period has expired.

12. The method of claim 11 wherein the cooling off period is applied to each of the plurality of devices.

13. The method of claim 11 wherein the cooling off period is applied only to the second device.

14. A method comprising:
monitoring, by a first device of a plurality of devices involved in a collaboration session that uses a shared resource, a state of each of the plurality of devices as one of an owner state, a not owner state, a gaining ownership state, and a losing ownership state;
receiving, by the first device, first input from a second device of the plurality of devices, wherein the first input represents a request to take control of the shared resource;
identifying, by the first device, that the second device is in the not owner state and that a third device of the plurality of devices is currently in the owner state, wherein the not owner state indicates that the second device is currently not in control of the shared resource and wherein the owner state indicates that the third device is currently in control of the shared resource;

starting a timer, by the first device, wherein control of the shared resource will automatically pass from the third device to the second device when a transition period defined by the timer expires;

modifying, by the first device, the state of the second device from the not owner state to the gaining ownership state, wherein second input received from the second device while in the gaining ownership state is buffered by the first device as the second input is received and not sent to each of the plurality of devices, wherein the second input represents at least one action to be taken using the shared resource;

modifying, by the first device, the state of the third device from the owner state to the losing ownership state, wherein third input received from the third device while in the losing ownership state is executed by the first device as the third input is received and a result obtained by executing the third input is sent to each of the plurality of devices, wherein the third input represents at least one action to be taken using the shared resource;

modifying, by the first device, the state of the third device from the losing ownership state to the not owner state upon expiration of the timer;

modifying, by the first device, the state of the second device from the gaining ownership state to the owner state upon expiration of the timer;

executing, by the first device, the second input once the second device is in the owner state;

sending, by the first device, a result obtained by executing the second input to each of the plurality of devices;

receiving, by the first device, fourth input from a fourth device of the plurality of devices, wherein the fourth input represents at least one action to be taken using the shared resource;

identifying, by the first device, that the fourth device is not in either the owner state or the gaining ownership state;

identifying, by the first device, that the fourth input does not represent a request to take control of the shared resource; and ignoring the fourth input.

15. The method of claim 14 further comprising:

receiving, by the first device, a cursor position for each of the plurality of devices including the second and third devices; and sending, by the first device, cursor information for each of the plurality of devices to each of the other devices, wherein the cursor information includes the cursor position and a cursor type identifier, wherein the cursor type identifier distinguishes the cursor belonging to whichever device of the plurality of devices currently in the owner state and the losing ownership state, and wherein the cursor information is sent regardless of the state of the device from which the cursor position was received.

16. The method of claim 14 further comprising:

determining, by the first device, that the second device is no longer part of the collaboration session but is currently listed as being in the owner state; and modifying, by the first device, the state of the first device from the not owner state to the owner state without passing through the gaining ownership state.

17. A device comprising:
a network interface;
a processor coupled to the network interface; and
a memory coupled to the processor and configured to store a plurality of instructions executable by the processor, the instructions including instructions for:

monitoring a state of each of a plurality of devices as one of an owner state, a not owner state, a gaining ownership state, and a losing ownership state, wherein the plurality of devices are involved in a collaboration session that uses a shared resource being shared by the device, receiving first input from a second device of the plurality of devices via the network interface, wherein the first input represents a request to take control of the shared resource;

identifying that the second device is in the not owner state and that a third device of the plurality of devices is currently in the owner state, wherein the not owner state indicates that the second device is currently not in control of the shared resource and wherein the owner state indicates that the third device is currently in control of the shared resource;

starting a timer, wherein control of the shared resource will automatically pass from the third device to the second device when a transition period defined by the timer expires;

modifying the state of the second device from the not owner state to the gaining ownership state, wherein second input received via the network interface from the second device while in the gaining ownership state is buffered by the first device as the second input is received and not sent to each of the plurality of devices, wherein the second input represents at least one action to be taken using the shared resource;

modifying the state of the third device from the owner state to the losing ownership state, wherein third input received via the network interface from the third device while in the losing ownership state is executed by the first device as the third input is received and a result obtained by executing the third input is sent to each of the plurality of devices, wherein the third input represents at least one action to be taken using the shared resource;

modifying the state of the third device from the losing ownership state to the not owner state upon expiration of the timer;

modifying the state of the second device from the gaining ownership state to the owner state upon expiration of the timer;

executing the second input once the second device is in the owner state;

sending a result obtained by executing the second input to each of the plurality of devices;

receiving fourth input from a fourth device of the plurality of devices, wherein the fourth input represents at least one action to be taken using the shared resource;

identifying that the fourth device is not in either the owner state or the gaining ownership state;

identifying that the fourth input does not represent a request to take control of the shared resource; and ignoring the fourth input.

* * * * *